(12) United States Patent
Chan et al.

(10) Patent No.: US 7,797,289 B2
(45) Date of Patent: Sep. 14, 2010

(54) METHOD AND APPARATUS FOR AUTOMATICALLY EXECUTING RULES IN ENTERPRISE SYSTEMS

(75) Inventors: Eric S. Chan, Fremont, CA (US); Vimal Chopra, San Jose, CA (US); Jia-Der Day, Palo Alto, CA (US); Vinod Eligeti, Redwood Shores, CA (US); Dharmendra Jambula, Foster City, CA (US); Lucy Liu, San Jose, CA (US); Terry M. Olkin, Niwot, CO (US)

(73) Assignee: Oracle International Corporation, Redwood Shores, CA (US)

( * ) Notice: Subject to any disclaimer, the term of this patent is extended or adjusted under 35 U.S.C. 154(b) by 591 days.

(21) Appl. No.: 11/850,566

(22) Filed: Sep. 5, 2007

(65) Prior Publication Data

US 2009/0063381 A1 Mar. 5, 2009

(51) Int. Cl.
*G06F 7/00* (2006.01)
*G06F 17/00* (2006.01)
*G06N 5/02* (2006.01)

(52) U.S. Cl. .................... 707/694; 707/703; 706/47
(58) Field of Classification Search .................. 706/47; 707/694, 703
See application file for complete search history.

(56) References Cited

U.S. PATENT DOCUMENTS 6,330,562 B1 * 12/2001 Boden et al. ................. 713/167
6,405,191 B1 * 6/2002 Bhatt et al. .................. 707/694

* cited by examiner

*Primary Examiner*—Donald Sparks
*Assistant Examiner*—Vincent M Gonzales
(74) *Attorney, Agent, or Firm*—Park, Vaughan & Fleming LLP

(57) ABSTRACT

One embodiment of the present invention provides an enterprise system that automatically executes a rule associated with an event. During operation, the system receives an event object at the enterprise system. Next, the system creates an intermediate event object based on the event object, wherein the intermediate object is an invocation context for the rule. The system also filters a set of rules with the intermediate event object to obtain a subset of rules. The system then selects a rule that is associated with the event from the subset of rules. Finally, the system executes the rule.

25 Claims, 2 Drawing Sheets

METHOD AND APPARATUS FOR AUTOMATICALLY EXECUTING RULES IN ENTERPRISE SYSTEMS

BACKGROUND

1. Field of the Invention

The present invention relates to enterprise computing systems. More specifically, the present invention relates to a method and an apparatus for automatically executing rules in enterprise computing systems.

2. Related Art

Many organizations use enterprise systems to manage and store large amounts of data. These enterprise systems typically use different types of policy, workflow, subscription, and/or preference frameworks to aid in the process of administering and accessing the enterprise system. However, these frameworks are typically add-on services and are fraught with problems.

These frameworks commonly make the following assumptions: policies are used to centralize the business rules; preferences maintain the various settings, which for example declare choices, desires, course of actions, or customizations; subscriptions are contractual equivalents of preferences expressed as conditions and actions upon interesting events; and preference profiles are collections of preferences that are associated with certain states of a user's presence in the system, including the user's activity, status, mood, etc. Unfortunately, there presently exists no common way to interrelate these different frameworks in a way that is standardized across all elements of an enterprise system.

SUMMARY

One embodiment of the present invention provides an enterprise system that automatically executes a rule associated with an event. During operation, the system receives an event object at the enterprise system. Next, the system creates an intermediate event object based on the event object, wherein the intermediate object is an invocation context for the rule. The system also filters a set of rules with the intermediate event object to obtain a subset of rules. The system then selects a rule that is associated with the event from the subset of rules. Finally, the system executes the rule.

In some embodiments of the present invention, the intermediate event object comprises an identifier for an environment associated with the event or rule, wherein the environment specifies entities associated with the event or rule.

In some embodiments of the present invention, the system creates the intermediate event object by retrieving data from the event object. Next, the system stores the data in the intermediate event object. The system also retrieves additional data from entities associated with the event object. Next, the system stores the additional data in the intermediate event object. The system then associates the entity identifiers (EIDs) of the entities associated with the additional retrieved data. Next, the system determines an effective Access Control List (ACL) from the EIDs associated with the additional retrieved data. Finally, the system authorizes access to the data stored in the intermediate event object using the associated effective ACL.

In some embodiments of the present invention, filtering the set of rules involves performing a pattern matching operation on the set of rules, wherein the pattern matching operation matches indexed predicates associated with the set of rules to data associated with the intermediate event object.

In some embodiments of the present invention, selecting the rule from the subset of rules involves evaluating rule conditions associated with each rule based on indexed predicates and sparse predicates over data associated with the intermediate event object.

In some embodiments of the present invention, after filtering the set of rules, the system determines a user context which facilitates selecting a rule from the subset of rules.

In some embodiments of the present invention, determining the user context involves: receiving the user context with the set of rules; and storing the user context with the set of rules.

In some embodiments of the present invention, the rule specifies: a set of indexed predicates required to invoke the rule; a set of sparse predicates required to invoke the rule; and a set of actions which are performed when the rule executes.

In some embodiments of the present invention, the set of actions can involve: notifying an actor which has a subscription associated with the event about the occurrence of the event, wherein the actor is an entity which can perform actions upon other entities, and wherein an entity is an object; notifying a user about the occurrence of the event; invoking any action on the enterprise system or any operation on any entity; invoking a second rule; resolving conflicts between preference settings, wherein the preference settings can be associated with multiple actors; combining multiple local preferences to derive global preferences for a shared workspace; switching between preference profiles; tagging the entity; categorizing the entity; selecting the sensitivity for the entity; enabling roles; disabling roles; granting privileges; and revoking privileges.

In some embodiments of the present invention, a second rule can extend the rule.

In some embodiments of the present invention, a policy can extend: a policy schema which specifies attributes associated with the rule; and a policy template which specifies how to perform data collection for data associated with the attributes.

Figure 1:
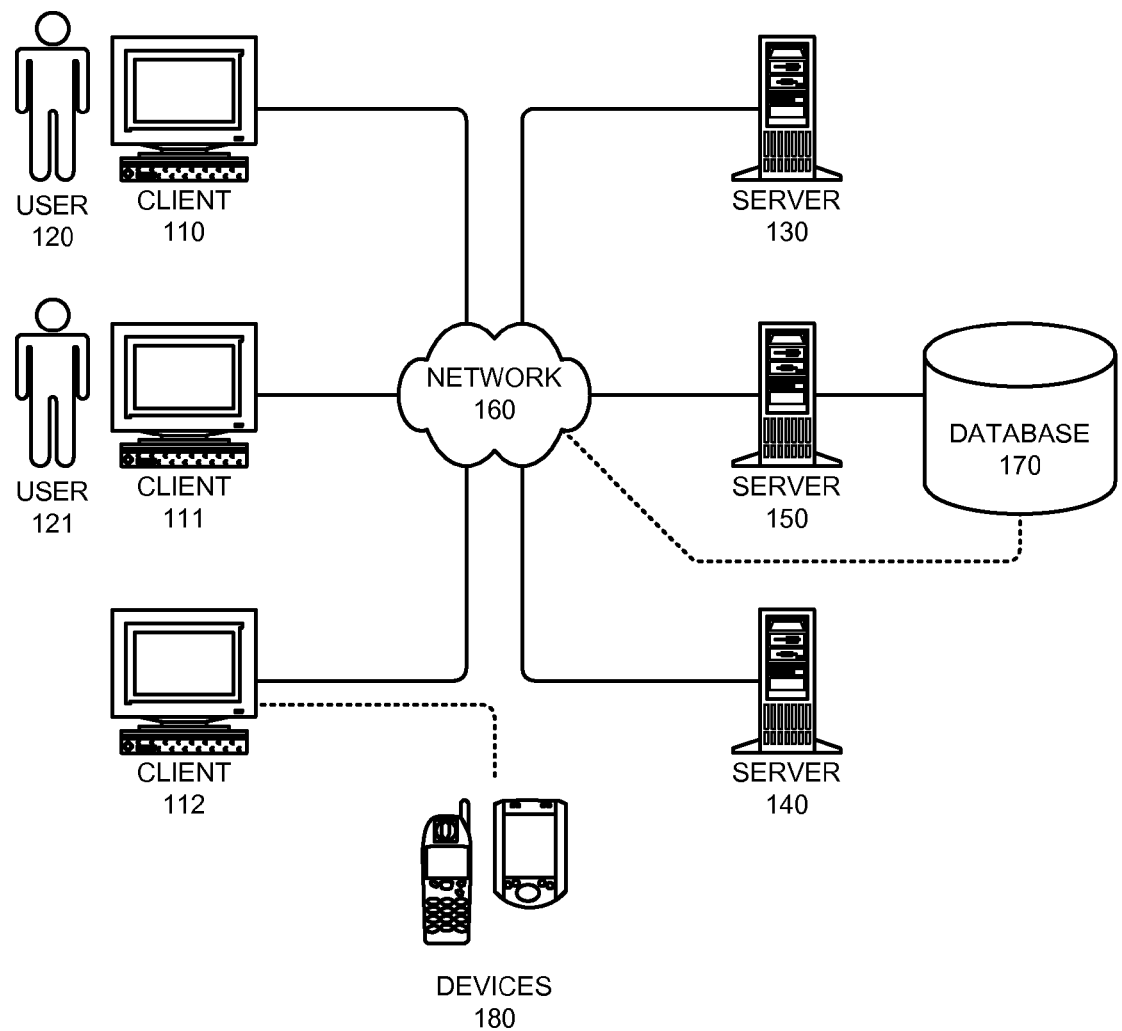
FIG. 1 illustrates an enterprise computing environment in accordance with an embodiment of the present invention.

Table 1 illustrates a "RuleDefinition" method in accordance with an embodiment of the present invention.

Table 2 illustrates a "Load Subscriptions" method in accordance with an embodiment of the present invention.

Table 3 illustrates a subscription object in accordance with an embodiment of the present invention.

Table 4 illustrates an event object in accordance with an embodiment of the present invention.

Table 5 illustrates a "Declare Attribute Set" method in accordance with an embodiment of the present invention.

Table 5B illustrates an "Assign Attribute Set" method in accordance with an embodiment of the present invention.

Table 6 illustrates a "Rule Manager—Create Rule Class" Application Programming Interface (API) in accordance with an embodiment of the present invention.

Table 7 illustrates a Policy Observers object in accordance with an embodiment of the present invention.

Table 8 illustrates an entity schema in accordance with an embodiment of the present invention.

Table 9 illustrates an Attribute Definition object in accordance with an embodiment of the present invention.

Table 10 illustrates the enumeration of the type of the properties in accordance with an embodiment of the present invention.

Table 11 illustrates an Attribute object in accordance with an embodiment of the present invention.

Table 12 illustrates a Property Value in accordance with an embodiment of the present invention.

Table 13 illustrates a Template object in accordance with an embodiment of the present invention.

Table 14 illustrates a Basic Template object in accordance with an embodiment of the present invention.

Table 15 illustrates an Attribute Template in accordance with an embodiment of the present invention.

Table 16 illustrates a Container object in accordance with an embodiment of the present invention.

Table 17 illustrates a Template Configuration object in accordance with an embodiment of the present invention.

Table 18 illustrates a Preference Profile object in accordance with an embodiment of the present invention.

Table 19 illustrates a PreferenceSetSchema object in accordance with an embodiment of the present invention.

Table 20 illustrates a PreferenceSetTemplate object in accordance with an embodiment of the present invention.

Table 21 illustrates a PreferenceSet object in accordance with an embodiment of the present invention.

Table 22 illustrates a PreferenceProperty object in accordance with an embodiment of the present invention.

Table 23 illustrates a PolicySchema object in accordance with an embodiment of the present invention.

Table 24 illustrates a PolicyTemplate object in accordance with an embodiment of the present invention.

Table 25 illustrates a Policy object in accordance with an embodiment of the present invention.

Table 26 illustrates a RuleDefinition object in accordance with an embodiment of the present invention.

Table 27 illustrates a Rule object in accordance with an embodiment of the present invention.

Table 28 illustrates a RuleConditionDefinition object in accordance with an embodiment of the present invention.

Table 29 illustrates a RuleActionDefinition object in accordance with an embodiment of the present invention.

Table 30 illustrates a SubscriptionSchema object in accordance with an embodiment of the present invention.

Table 31 illustrates a SubscriptionTemplate object in accordance with an embodiment of the present invention.

Table 32 illustrates a Subscription object in accordance with an embodiment of the present invention.

Table 33 illustrates a SubscriptionRuleDefinition object in accordance with an embodiment of the present invention.

Table 34 illustrates a SubscriptionConditionDefinition object in accordance with an embodiment of the present invention.

Table 35 illustrates a SubscriptionActionDefinition object in accordance with an embodiment of the present invention.

Table 36 illustrates a SubscriptionRule object in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides an enterprise system that automatically executes a policy associated with an event. This enterprise system combines policies, such as container level administrative policies, user subscriptions, and container and user preferences to define automated business processes.

In one embodiment of the present invention, the event can be an occurrence of any action in the enterprise system, an operation on an entity associated with the enterprise system, or a timer-related alarm event.

In one embodiment of the present invention, the entity can be any object that can be uniquely identified by an entity identifier (EID).

In one embodiment of the present invention, the entity can be any object.

In one embodiment of the present invention, the policy can be any set of actions that governs the life cycle of an entity. In this embodiment, a rule-based application or workflow can represent the policy.

In one embodiment of the present invention, the policy can perform administrative actions. In this embodiment, the policy can be attached to a container (or a folder) to govern the lifecycles of entities associated with the container.

In one embodiment of the present invention, the container can include additional entities. In this embodiment, the container can contain additional containers.

In one embodiment of the present invention, a subscription is a policy which is associated with a user and an entity. In this embodiment, the subscription can be configured to react to or to notify a user of an event on an entity.

In one embodiment of the present invention, a rule-based application associated with the enterprise system implements the policy. The policy can include: simple actions; workflow actions; and complex actions, which are combinations of simple and workflow actions.

In one embodiment of the present invention, the rule-based application is associated with a user who created the policy or subscription and a user who owns the policy or subscription. Note that the creator and owner of policy or subscription need not be the same user.

In one embodiment of the present invention, the rule-based application is associated with a user context at the time of creation of the policy or subscription for use as a runtime context for executing rule conditions and rule actions which are associated with the policy or subscription.

In one embodiment of the present invention, the user or administrator can activate one or more principals (which can also be delegated principals) and/or enable one or more roles at the time of deployment of the policy or at the time of subscription. In this embodiment, the activated principals and enabled roles can be part of the user context which is associated with the policy or subscription. Furthermore, the enterprise system can use the active principals and enabled roles to facilitate authorizing execution of conditions and actions which are associated with the policy or the subscription.

In one embodiment of the present invention, the policy can extend or derive from one or more policy templates. These templates specify user interaction aspects, such as forms and menus, which the administrator or the user can use to provide values for required attributes associated with the policy.

In one embodiment of the present invention, the policy templates can specify how to perform data collection from additional sources, such as enterprise, workspace, environment, preferences, user context, databases, and third-party applications.

In one embodiment of the present invention, a policy template can extend one or more policy schemas. These policy schemas specify definitions for the rules associated with the policy and for attributes associated with the policy.

In one embodiment of the present invention, the policy can extend one or more policy schemas.

In one embodiment of the present invention, the administrator or the user can design rules associated with the policy using Boolean expressions. In this embodiment, the Boolean expressions contain bind variables represented by attribute definitions. These variables can be bound at deployment or subscription time.

In one embodiment of the present invention, the administrator or the user can specify predefined rule definitions or rule templates for the policy schema and policy template.

In one embodiment of the present invention, users can create subscriptions in a declarative form, i.e. without using Boolean expressions, from which the rules are generated. This embodiment enables novice users to create subscriptions.

In one embodiment of the present invention, the administrator or the user can bind a policy template to a container which is associated with a scope. This enables a policy template of a lower scope to extend a policy template of a higher scope. Note that a scope can represent a logical region in the enterprise system.

In one embodiment of the present invention, a policy template associated with a given container can be final, i.e. not extendable.

In one embodiment of the present invention, if a policy template is bound to a container, the enterprise system requires policies which are associated with the container to be derived from the policy template. Note that the policies which are associated with the container govern the lifecycle of entities associated with the container. Furthermore, note that the container can include: a logical region of the enterprise system; a workspace; an organization, wherein an organization is a container of workspaces and sub-organizations; a folder; an application; a set of files; and any other data that can be associated with the container.

In one embodiment of the present invention, two policy templates based on the same policy schema are compatible policy templates. In this embodiment, a policy template in a sub-container can extend compatible policy templates (superior) in a parent containers hierarchy chain. Furthermore, in this embodiment, the sub-container policy template (inferior) can include more constraints than the superior policy templates.

In one embodiment of the present invention, the administrator or the user can add to the policy template rules that extend rules associated with a policy template of a higher scope. This can involve joining predicates (Boolean expressions) by conjunction with predicates associated with the policy template of the higher scope. Note that using a conjunction operation ensures that the predicates from the policy template constrain conditions of the policy template of the higher scope without contradicting conditions of the policy template of the higher scope.

In one embodiment of the present invention, the enterprise system stores predicates associated with the policy template of the higher scope with the policy template of the lower scope. This embodiment prevents changes to the policy template of the higher scope from affecting the policy template of the lower scope.

In one embodiment of the present invention, the enterprise system references predicates associated with the policy template of the higher scope with the policy template of the lower scope without storing the predicates associated with the policy template of the higher scope with the policy template of the lower scope. This embodiment ensures that dependent policy templates remain consistent with the policy template that the dependent policy templates extend.

In one embodiment of the present invention, the enterprise system can parameterize bind variables which are bound to constants at deployment time or at runtime.

In one embodiment of the present invention, a preference profile can be associated with the container. This enables the policy creator to bind variables of a target scope or a higher scope to constants from preference sets associated with the target scope at the time the enterprise system deploys the policy. Note that these preferences can include: a quota for storage use, a quota for notification messages, a presence of a particular user, group, or resource, delivery and device preferences, preferred time zones and locales of a user, access to an organization or a workspace, and any other preference that can be bound to the variables of the target scope.

In one embodiment of the present invention, the enterprise system enables a user to attach a policy or subscription to an entity. Note that a container can be an entity. In this embodiment, the policy or subscription can include or generate rules. In one embodiment, the subscription rules can be added to the rules of the policy that is associated with the subscription.

In one embodiment of the present invention, the subscription can include attributes to customize the condition and action components which the enterprise system evaluates when executing the subscription.

In one embodiment of the present invention, the enterprise system can bind user preferences to bind variables associated with the subscription.

In one embodiment of the present invention, the policy schema, the subscription schema, and a preference schema (which specifies preference attributes associated with a container or user) can use attribute definitions to define the parameters that they require. In this embodiment, first class attribute definitions can be associated with each of these schemas. For example, a user can define and use the attribute definition "preferred part of the day for meetings" across all schemas associated with the container or user. The "preferred part of the day for meetings" attribute can be set up in the user's preference set. When the policy or subscription schemas include the attribute definition for "preferred part of the day for meetings," the templates associated with these schemas can prescribe to use the attribute from the user's preference as a binding to the variables for the user's policy or subscription.

In one embodiment of the present invention, policies or subscriptions can influence the creation and usage of user preferences. For example, as part of a user's notification preferences, the user can specify a list of delivery channels in order of preference. Suppose that the user's first preferred delivery channel is push mail. At runtime, when the enterprise system retrieves the user's preferred delivery channel from the user's notification preference, the enterprise system can invoke the notification preference policy which can dynamically adjust the notification delivery channel. In one scenario, the preference policy can recommend the user's second preferred delivery channel when the user has exceeded the user's push mail quota for the day In one embodiment of the present invention, the enterprise system can associate multiple policies with an entity. In this embodiment, when an event associated with the entity occurs, the enterprise system automatically notifies and executes the multiple policies.

In one embodiment of the present invention, a source entity that generates the event can automatically invoke a policy associated with the event.

In one embodiment of the present invention, the source entity that generates the event can alert a third-party component about the occurrence of the event. In this embodiment, the third-party component invokes the policy associated with the event.

In one embodiment of the present invention, policies associated with a container affect lifecycles of: workspaces, folders, documents, discussion forums, conferences, messages, calendars, tasks, and journals which are associated with the container, as well as presences that the users can create, share, coordinate, and communicate with each other.

In one embodiment of the present invention, policies can affect how users detect each other's presence or receive urgent messages via pervasive devices.

In one embodiment of the present invention, the enterprise system can use policies for record management, message control, user/device/application provisioning, notification, and any other process that the enterprise system can perform.

In one embodiment of the present invention, the enterprise system can implement policies using: forward-chaining systems, such as Rete (systems based on the Rete algorithm) and rule-based production systems; backward chaining systems, such as prolog or datalog based systems; database rules management systems; and expression filter based systems.

In one embodiment of the present invention, the enterprise system associates entities, such as folders, artifacts, messages, and users with unique entity identifiers (EIDs).

In one embodiment of the present invention, the system associates an access control list (ACL) with each entity. This ACL can include permission grants or denies, for example "Grant READ to User-A" and "Deny READ to User-B."

In one embodiment of the present invention, an event object includes a list of EIDs for entities associated with the event object. In this embodiment, the event object does not include the states of the entities, but can only include the EIDs of the entities to access the states of the entities.

In one embodiment of the present invention, the system creates an intermediate event object based on the original event object. The intermediate event object is the invocation contexts for the policy and subscription rules. The intermediate event object contains the states of any relevant entities that are associated with the original event, the environment of the event (such as user context, session, scope, etc), and the policy or subscription to be applied to the event. The enterprise system constructs the intermediate event by using the system actor's user context to: load the relevant entities; retrieve and compute the states from the relevant entities; store the states of the entities in the intermediate event; associate each state entry in the intermediate event by the unique entity identifiers (EIDs) of one or more source entities that are used to compute the state entry; and use the associated EIDs to determine the effective Access Control List (ACL) for authorization of the policy or subscription owner's user context to access any state entry in the intermediate event.

Performance and scalability improvements can be realized by pre-computing the states of the entities under the system actor context and placing the states in the intermediate event (invocation context). This process yields performance improvements by eliminating the overheads of repeatedly loading the same entity under each of the policy or subscription owner's user contexts, which otherwise is necessary to perform proper authorization. This process also achieves the same level of security by letting the rule conditions and rule actions in the user policies or subscriptions to access a pre-computed state entry in the intermediate event only if the policy or subscription owner's user context has READ privileges for all entities associated with the state entry. If the state entry is computed from the states of one or more entities, this process yields additional performance improvements by eliminating the overheads of repeating the same computations under each of the policy or subscription owner's user contexts.

In one embodiment of the present invention, the enterprise system enforces access control when executing rules (both the predicate or condition and action components) associated with a policy or a subscription based on the privileges of the user context associated with the policy or subscription.

In one embodiment of the present invention, the enterprise system can save a user context used at the time of policy deployment or subscription with the policy or the subscription for use as the runtime context when executing the rule conditions and actions. In this embodiment, if the user or administrator has activated a principal (which can also be a delegated principal) and enabled a number of roles at the deployment or subscription time, the enterprise system can include the active principal and enabled roles as part of the user context saved in the policy or subscription. Note that the user context is important because: 1) structured query language SQL data manipulation language DML statements included with condition predicates and action callback procedures can involve access control, and 2) invocation of the system APIs from the codes included with condition predicates and action callback procedures can involve access control.

In one embodiment of the present invention, the enterprise system separates the rule condition expression into two partial conditions. The first part includes only indexed predicates, and the second part includes only sparse predicates. One skilled in the art can understand the concepts of indexed predicates and sparse predicates as used in the Oracle Database 10g Expression Filters and described in U.S. Pat. No. 7,127,467, to inventors, Aravind Yalamanchi, Dieter Gawlick, and Jagannathan Srinivasan, entitled "Managing expressions in a database system."

In one embodiment of the present invention, the enterprise system establishes a system actor's user context which is associated with a system actor. In this embodiment, during a bulk filtering phase, the enterprise system executes the indexed predicates and the included DML statements (excluding the sparse predicates during bulk filtering phase) under the system actor's user context to use the privileges of the system actor.

In one embodiment of the present invention, the enterprise system performs statistical analysis of the indexed predicates to estimate the expected number of rules per composite index. If the expected number of rules is larger than a threshold, the enterprise system will evaluate the sparse predicates with the indexed predicates under the system actor's user context, as part of the bulk filtering phase, to select a smaller percentage of the matching rules. This way the system avoids frequent context switching for owner's user contexts for a large set of matching rules.

In one embodiment of the present invention, after the enterprise system executes indexed predicates, (by default or by determination from the expected number of rules) if the number of matching rules in the filtered result set is larger than a threshold, the system executes the sparse predicates (excluding the indexed predicates) of the matching rules under the same system actor's user context, as part of the bulk filtering phase, to select a smaller percentage of the matching rules. This way the system has robustness to adapt to the cases where the estimation of the expected number of rules per composite index, based on the last time of analysis, becomes stale due to changes in the rules or number of rules. Moreover, the system avoids frequent context switching for owner's user contexts for a large set of matching rules.

In one embodiment of the present invention, after the enterprise system applies the bulk filtering and activates a subset of policies or subscriptions, the enterprise system reevaluates the rule condition expressions comprised of both the indexed predicates and sparse predicates under the policy or subscriber owner's user context. This embodiment enables the enterprise system to maintain security without decreasing the speed of filtering a large number of the policies and subscriptions.

In one embodiment of the present invention, the following characteristics of this process may be observed: during the bulk filtering phase for each of the events, a large number of policies and subscriptions can be processed by evaluating each indexed predicate at most one time under the same system actor's user context; by not evaluating the sparse predicates whose truth-values can depend on the user contexts, the method yields additional performance and scalability improvements; the bulk filtering activates a significantly small percentage of the user policies and subscriptions; the system evaluates each of the activated policies and subscriptions under the corresponding policy or subscriber owner's user contexts; the system evaluates the sparse predicates only under the policy or subscriber owner's user context; and the system evaluates the indexed predicates again under the policy or subscriber owner's user context because some indexed predicates may evaluate to true in system actor's user context but may evaluate to false in the policy or subscriber owner's user contexts.

In one embodiment of the present invention, the enterprise system enables users to collaborate while being subject to administrative policies. In this embodiment, by selecting policies and subscriptions, administrators can specify a plan of actions to govern the lifecycles of objects in a container.

In one embodiment of the present invention, the enterprise system can use policy to manage preferences at runtime and to resolve conflicts among preference settings.

In one embodiment of the present invention, preferences can supply parameters for policies at runtime.

In one embodiment of the present invention, policies can mediate access of preferences. The enterprise system can combine several local preferences into a policy to derive global preferences. For example, for a shared workspace, the enterprise system can find the correlation among the preferences of conference participants to derive the global preference.

In one embodiment of the present invention, the enterprise system can use policies to switch between profiles of preferences, i.e. there may be more than one instance of each type of preference, such as EmailPreference, PresencePreference, NotificationPreference, ConferencePreference, etc. In this embodiment, the policies can mix the preferences for different profiles, such as vacation profile, lazy profile, eager profile, escalated profile, etc.

In one embodiment of the present invention, policies can be reactive. For example, a policy can adjust preference profiles based on a user's calendar entry, task list entry, presence, and activities.

In one embodiment of the present invention, actors, such as users, workspaces, and communities can specify their own language preferences. For example, an administrator can specify a policy that selects the language from the preferences of Workspace, User, Community, and System in order of precedence.

In one embodiment of the present invention, the enterprise system can use policy to dynamically enable/disable Roles (and principals) of a session to enforce the principle of least privileges and separation of duties. For example, the enterprise system can use a policy to map biometric credentials to a set of Roles to be enabled.

In one embodiment of the present invention, the enterprise system can use policy to dynamically provision users and guard the assignment of privileges to these users. For example, the enterprise system can use a policy to limit the granting of privileges by a role-based access control (RBAC) scheme and completely prevent the discretionary and delegation based privileges for a user.

In one embodiment of the present invention, policy objects can be artifacts in a collaboration system that enable policy authors to collaborate for the development of policies within the scope and under the control of additional policies the enterprise system has deployed and activated on the scope. For example, a record management policy may undergo a management approval workflow policy for update and deployment. In this case, policy can apply in a self-referential way using a version control mechanism associated with the artifact to differentiate the working version and the edited version.

In one embodiment of the present invention, the enterprise system can insert subscriptions' rules into the rules associated with policies. In this embodiment, the subscriptions can be rule-based user instructions.

In one embodiment of the present invention, the enterprise system can customize subscription templates for individual workspaces to enable/disable the extent of the subscriptions. For example, a project manager may allow/disallow pattern matching with the contents of certain artifacts in the user subscriptions.

Enterprise Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Different embodiments of the present invention may use different configurations, and are not limited to the configuration illustrated in enterprise computing environment 100. For example, in one embodiment of the present invention, enterprise computing environment comprises only one server, while in another embodiment of the present invention, enterprise computing environment 100 includes a separate policy server, database server, and subscription server.

Automatically Executing Rules

Figure 2:
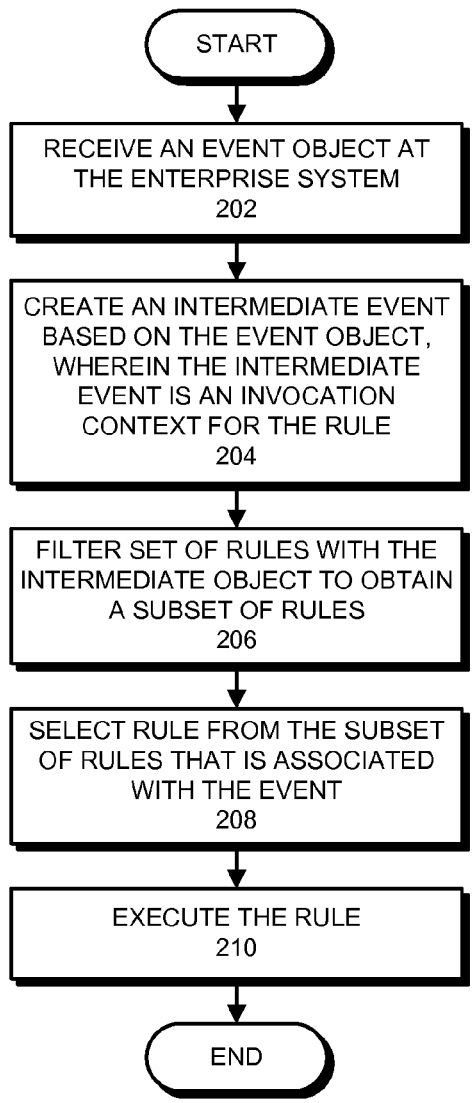
FIG. 2 presents a flowchart illustrating the process of automatically executing rules in accordance with an embodiment of the present invention.

FIG. 2 presents a flowchart illustrating the process of automatically executing rules in accordance with an embodiment of the present invention. During operation, the system receives an event object at the enterprise system (operation 202). Next, the system creates an intermediate event object based on the event object, wherein the intermediate object is an invocation context for the rule (operation 204). The system also filters a set of rules with the intermediate event object to obtain a subset of rules (operation 206). The system then selects a rule that is associated with the event from the subset of rules (operation 208). Finally, the system executes the rule (operation 210). This process is described in more detail below in the "Examples" section.

Creating the Intermediate Event Object

Figure 3:
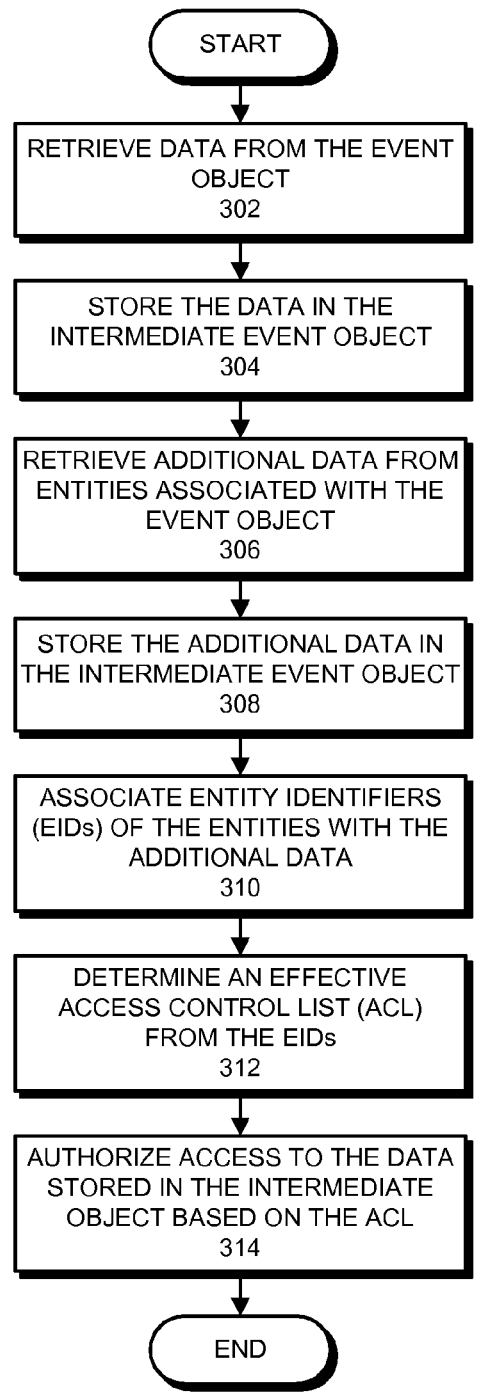
FIG. 3 presents a flowchart illustrating the process of creating the intermediate event object in accordance with an embodiment of the present invention.

FIG. 3 presents a flowchart illustrating the process of creating the intermediate event object in accordance with an embodiment of the present invention. In some embodiments of the present invention, the system creates the intermediate event object by retrieving data from the event object (operation 302). Next, the system stores the data in the intermediate event object (operation 304). The system also retrieves additional data from entities associated with the event object (operation 306). Next, the system stores the additional data in the intermediate event object (operation 308). The system then associates the entity identifiers (EIDs) of the entities associated with the additional retrieved data (operation 310). Next, the system determines an effective Access Control List (ACL) from the EIDs associated with the additional retrieved data (operation 312). Finally, the system authorizes access to the data stored in the intermediate event object using the associated effective ACL (operation 314). This process is described in more detail below in the "Examples" section.

EXAMPLES

This section presents several example embodiments in further detail.

Table 1 illustrates a RuleDefinition method in accordance with an embodiment of the present invention. This method can specify conditions, actions, events, and functions to construct rules associated with a policy. Note that a complex policy may employ multiple rule definitions. In one embodiment of the present invention, rule actions can start a long running workflow, which is a more complex plan of temporal sequences of processes in contrast to singular actions.

In one embodiment of the present invention, the RuleDefinition can include two different levels of knowledge bases. One level is composed of long term memory components called rule bases, and the other level is composed of short term memory components called fact bases. For rule-based systems, the users can define the rules as "IF (RuleCondition) THEN <RuleAction>" constructs. In this embodiment, the enterprise system can use a pattern matching system such as a rete network or a database expression filter to evaluate the condition.

In one embodiment of the present invention, the rule definitions of the rule-based system can comprise the long-term memory components of the rule-based system. This is in contrast to the rules generated from high-level subscriptions, which can be inserted into the fact bases of the rule-based system. The rule definition illustrated in Table 1 is associated with a policy, and is part of the long-term memory component of the rule-based system. In this example, the condition part of the rule definition defines the pattern matching expressions between the user subscription facts and the event facts.

TABLE 1

Rule Definition

```
rule RuleDefinition {
    if (fact Subscription sub &&
        fact Event event &&
        EvaluateIndexedPredicates(sub.condition, event)) {
        ActivateUserContext(sub.userContext);
        IF EvaluateCondition(sub.condition, event)
        THEN DoAction(sub.action, event);
    }
}
```

In one embodiment of the present invention, the rule definition illustrated in Table 1 allows one to evaluate the rule conditions and rule actions contained in the Subscription object. The first "if" clause illustrated in Table 1 defines the rule condition, which declares the subscription fact, event fact, and invokes the EvaluateIndexedPredicates function to perform pattern matching between the subscription fact and event fact. In this example, the function EvaluateIndexedPredicates can evaluate the partial rule condition object of the Subscription comprised only of the indexed predicates. The rule action illustrated in Table 1 includes the ActivateUserContext operation and another IF . . . THEN . . . clause. The ActivateUserContext operation activates the subscription owner's user context stored with the subscription. The function EvaluateCondition can evaluate the rule condition object of the Subscription comprised of both indexed predicates and sparse predicates. If the subscription matches the event properties, the DoAction function can invoke the rule action object of the Subscription. With each function, the Event object is passed to the callback classes of the condition and action objects. In this embodiment, the enterprise system performs the pattern matching part of the rule definition in the system actor's user context, which is associated with the system actor. Furthermore, at the beginning of the action, the enterprise system activates the end user's user context from the subscription time, and the enterprise system performs the conditions and actions under proper access control associated with the end user. This provides a scaleable and secure framework.

In one embodiment of the present invention, the enterprise system can use the RuleDefinition of Table 1 to support any number of rules that a user specifies.

In one embodiment of the present invention, the fact base can include facts, such as user subscriptions. Furthermore, the fact base is associated with a short term memory component because the enterprise system can assert and retract facts dynamically. Note that this does not imply that subscriptions are transient objects. For example, when a user disables a subscription, the enterprise system retracts corresponding subscription facts from the fact base. However, the subscription objects are persistent objects, and therefore, the enterprise system can assert the subscription facts back into the fact base in response to the occurrence of an event.

Table 2 illustrates a Load Subscriptions method in accordance with an embodiment of the present invention. Upon the occurrence of an event, this method can load a set of subscriptions that match a particular event source and event type.

TABLE 2

Load Subscriptions

```
rule NeedSubscriptions {
    if (fact Event event) {
        loadSubscriptions(event.source, event.type);
    }
}
```

Table 3 illustrates a subscription object in accordance with an embodiment of the present invention. In one embodiment of the present invention, after creating an instance of the subscription object, a user can use the method illustrated in Table 6 to specify that filter expressions in the rlm$RuleCond can be matched against the attribute sets in the Event objects.

TABLE 3

Subscription Object

```
CREATE TABLE Subscription (
    rlm$RuleId      VARCHAR2(100),
    rlm$RuleCond    VARCHAR2(4000),
    rlm$Enabled     CHAR(1) DEFAULT 'Y',
    rlm$RuleDesc    VARCHAR2(1000),
    Subscriber      User,
    UserContext     UserContext,
    RuleAction      VARCHAR2(40));
```

Table 4 illustrates an Event object in accordance with an embodiment of the present invention. In one embodiment of the present invention, the user can use the method illustrated in Table 5 to declare Event objects as an attribute set for the expression filter.

TABLE 4

Event Object

```
CREATE OR REPLACE TYPE Event AS OBJECT (
    SourceScope   Scope,
    Source        Entity,
    Type          EventDefinition,
    ActionDoer    Actor);
```

TABLE 5

Declare Attribute Set Method

```
begin
    dbms_expfil.create_attribute_set(attr_set => 'Event',
        from_type => 'YES');
end;
```

TABLE 5B

Assign Attribute Set Method

```
begin
    dbms_expfil.assign_attribute_set(attr_set => 'Event', expr_tab =>
        Subscription, expr_col => ' rlm$RuleCond');
end;
```

Oracle database rule manager and expression filters provide the PL/SQL API "dbms_rlmgr.create_rule_class" to create a subscription rule class table and binds the event structure to the expression filter column.

TABLE 6

Rule Manager Create Rule Class API

```
BEGIN
    dbms_rlmgr.create_rule_class (
        rule_class => 'Subscription',
        event_struct => 'Event',
        actprf_spec =>  'Subscriber    User,
                        UserContext    UserContext,
                        RuleAction     VARCHAR2(40)
END;
```

In Oracle database, when one creates a rule class, the rule manager performs the following setups:

create the rule class table called Subscription which stores the rule condition "expression filter" column and other columns (described in Table 3)

make the event structure an attribute set and bind it to the expression filter column of subscription table (described in Table 4 and Table 5), alter the event structure to support additional helper methods, create the predicate table and corresponding indexes for the indexed predicates, create the pl/sql package to evaluate indexed and sparse predicates.

Among the PL/SQL methods and packages generated by the rule manager, the following procedure "filter_proc" evaluates the indexed predicates by directly querying the associated predicate table. It returns all the rules in the o_ref_cursor that satisfy the indexed predicates. It excludes sparse predicates from evaluation.

index_package.filter_proc(REFCURSOR o_ref_cursor, Event event);

The rule manager generates the following function "get_trueexprids" that first evaluates the indexed predicates. It then checks among the selected rules for those that have associated sparse predicates. If there are sparse predicates, it evaluates them to return the subset of selected rules. The function returns a list of ROW IDs of selected rules.

FUNCTION index_package.get_trueexprids(EVENT event)

The rule manager generates the following method in the Event object that can be used to evaluate an expression filter associated with a rule in a Subscription table.

Event.dynamicEval(Number evaluation status, VARCHAR2 rule_condition, EVENT event);

The above PL/SQL routines are used for rule selection process in accordance with an embodiment of the present invention. The rule selection process performs pattern matching of different parts of the expression filter with the attributes of the Event.

In one embodiment of the present invention, a user's subscription persist in the subscription table. This subscription table can include additional columns, such as a user contexts column and enable state which are associated with a given subscription.

In one embodiment of the present invention, the enterprise system can employ policy observers metadata to register policies which the enterprise system is to notify of events associated with particular triggers associated with an event source entity. In this embodiment, when the triggers fire, the enterprise system dispatches an event object to the associated policies. These policies evaluate the event and activate associated actions. Table 7 illustrates a Policy Observers object in accordance with an embodiment of the present invention.

TABLE 7

| PolicyObservers Object |
| --- |
| PolicyObservers => <br> Name : string, <br> [Description] : richtext, <br> [Source] : Entity, <br> EventTypes : {EventDefinition}, <br> Observers : <Policy> |

In one embodiment of the present invention, the enterprise system can create or update an observer instance on demand when the user submits a new subscription. This observer can activate a subscription policy upon the occurrence of the event.

In one embodiment of the present invention, different policies can perform different actions in response to receiving the event object. For example, a policy can: perform an audit operation; execute record management operations; execute a workflow; perform message filtering; perform notification operations; and perform any other actions an enterprise system can perform.

In one embodiment of the present invention, a source entity can be associated with multiple events. In this embodiment, the source entity can create different event objects in response to different triggers.

Table 8 illustrates an entity schema in accordance with an embodiment of the present invention. In this embodiment, the entity schema can specify the name of and type of attributes in the entities of an entity class. Note that a user can define entity schemas to extend the attributes of the entities.

TABLE 8

| Entity Schema |
| --- |
| Entity ::= EntitySchema <br> EntitySchema => <br>     [Description] : richtext, <br>     Attributes : {part ref AttributeDefinition} |

Table 9 illustrates an Attribute Definition object in accordance with an embodiment of the present invention. This object can specify the name, the type, and the enumeration of allowed values for attributes. Note that the attribute types can include any data type, such as String, Integer, Float, Boolean, and Date.

TABLE 9

| AttributeDefinition Object |
| --- |
| Identifiable ::= AttributeDefinition <br> AttributeDefinition => <br>   Name : string, <br>   [Description] : richtext, <br>   Searchable : boolean, <br>   Type : immutable part PropertyType, <br>   AllowedValues : <part CollabPropery>, <br>   [DefaultValue] : part PropertyValue, <br>   [MinimumValue] : part PropertyValue, <br>   [MaximumValue] : part PropertyValue, <br>   [MinimumValueInclusive] : boolean, <br>   [MaximumValueInclusive] : boolean |

Table 10 illustrates the enumeration of the type of the properties.

TABLE 10

| PropertyType Enumeration |
| --- |
| PropertyType ::= Identifiable \| String \| Integer <br>   \| Boolean \| Timestamp \| Uri \| Float \| DateTime \| <br>   \| List<Identifiable> \| List<String> <br>   \| List<Integer> \| List<Boolean> <br>   \| List<Timestamp> \| List<Uri> \| List<Float> <br>   \| List<DateTime> <br>   \| EntityClass \| List<EntityClass> |

Table 11 illustrates an Attribute object in accordance with an embodiment of the present invention. An attribute object holds a property value, which is compatible with the type and constraints imposed by the attribute definition.

TABLE 11

| Attribute Object |
| --- |
| Identifiable ::= Attribute <br> Attribute => <br>   Definition : immutable ref AttributeDefinition, <br>   PropertyValue : part PropertyValue |

Table 12 illustrates a PropertyValue in accordance with an embodiment of the present invention. A property's value can be either a primitive type, an identifiable, or a list of values.

TABLE 12

| Property Value |
| --- |
| type PropertyValue is <br>   string \| <string> |

TABLE 12-continued

| Property Value |
| --- |
| \| integer \| <integer> |
| \| boolean \| <boolean> |
| \| timestamp \| <timestamp> |
| \| uri \| <uri> |
| \| float \| <float> |
| \| DateTime \| <DateTime> |
| \| ref Identifiable \| <ref Identifiable> |

Table 13 illustrates a Template object in accordance with an embodiment of the present invention. A template object defines the reusable structures that can be replicated in new entities of an entity class.

TABLE 13

| Template Object |
| --- |
| Artifact ::= Template |
| Template => |
|     [Description] : richtext |

Table 14 illustrates a Basic Template object in accordance with an embodiment of the present invention. A basic template uses the basic attribute templates to define the simple reusable structures.

TABLE 14

| BasicTemplate Object |
| --- |
| Template ::= BasicTemplate |
| BasicTemplate => |
|   EntitySchema    : EntitySchema, |
|   AttributeTemplates  : {part AttributeTemplate} |

Table 15 illustrates an Attribute Template object in accordance with an embodiment of the present invention. An attribute template is a template for creating an attribute according to a specific attribute definition. The settings for Mandatory, Prompted, ForceDefault, and DefaultValue must not violate the following two constraints: "if Mandatory and not Prompted then DefaultValue is not null" and "if Force-Default then Mandatory and DefaultValue is not null."

TABLE 15

| AttributeTemplate Object |
| --- |
| Identifiable ::= AttributeTemplate |
| AttributeTemplate => |
|   Definition          : ref AttributeDefinition, |
|   Mandatory          : boolean, |
|   Final               : boolean, |
|   Prompted           : boolean, |
|   ForceDefault       : boolean, |
|   AllowedValues     : <part CollabPropery>, |
|   [DefaultValue]     : part PropertyValue, |
|   [MinimumValue]    : part PropertyValue, |
|   [MaximumValue]    : part PropertyValue, |
|   [MinimumValueInclusive]  : boolean, |
|   [MaximumValueInclusive]  : boolean |

Table 16 illustrates a Container object in accordance with an embodiment of the present invention. This object defines a logical region or scope for policies, workflows, and preferences. Note that the available templates can include templates that the enterprise system has configured and bound to the container using template configurations. Furthermore, note that containers can include scopes and folders.

TABLE 16

| Container Object |
| --- |
| Identifiable ::= Container |
| Container => |
|   Name                     : string, |
|   [ActivePreferenceProfile]   : PreferenceProfile, |
|   PreferenceProfiles         : {PreferenceProfile}, |
|   AttachedPolicies           : getAttachedPolicies( ):{Policy}, |
|   Attached Workflows: |
| getAttachedWorkflows( ):{Workflow}, |
|   TemplateConfigurations    : {part TemplateConfiguration} |

Table 17 illustrates a Template Configuration object in accordance with an embodiment of the present invention. This object, which is associated with a container, binds a set of templates to the container. Furthermore, this object can configure and bind a set of workflow, policy, and subscription templates to the container. In this embodiment, if the template configuration is final, sub-containers cannot extend the templates and are required to use them as the user has defined them. Furthermore, if the Mandatory attribute of the template configuration is true, all designated entities in the container and sub-containers are required to derive from these templates.

In one embodiment of the present invention, two templates are compatible if they both extend the same EntitySchema object. A template can override a compatible template from a parent containers chain as long as the template from the parent containers chain is not marked final. In this embodiment, the sub-container inherits templates from the template configurations associated with the parent containers chain by default unless the sub-container defines a template of the same EntitySchema to override that of the parent container.

TABLE 17

| TemplateConfiguration Object |
| --- |
| Identifiable ::= TemplateConfiguration |
| TemplateConfiguration => |
|   Name        : string, |
|   [Description] : richtext, |
|   Templates   : {Template}, |
|   Final       : boolean, |
|   Mandatory   : boolean, |
|   Parent      : getParent( ):Container |

In one embodiment of the present invention, two templates are compatible if they both extend the same EntitySchema object. A template can override a compatible template from a parent containers chain as long as the template from the parent containers chain is not marked final. In this embodiment, the sub-container inherits templates from the template configurations associated with the parent containers chain by default unless the sub-container defines a template of the same EntitySchema to override that of the parent container.

Table 18 illustrates a Preference Profile object in accordance with an embodiment of the present invention. This object contains a collection of preference sets. In this embodiment, the user can activate a preference profile from an available list of preset preference profiles. For example, the user can switch back and forth between a standard operation profile when the user is in the office and a business travel profile when the user is traveling for business.

TABLE 18

PreferenceProfile Object

Entity ::= PreferenceProfile
PreferenceProfile =>
    Name          : string,
    [Description]   : richtext,
    PreferenceSets  : { PreferenceSet}

Table 19 illustrates a PreferenceSetSchema object in accordance with an embodiment of the present invention. This schema specifies metadata for PreferenceSets.

TABLE 19

PreferenceSetSchema Object

EntitySchema ::= PreferenceSetSchema
PreferenceSetSchema => ;

Table 20 illustrates a PreferenceSetTemplate object is accordance with an embodiment of the present invention. The preference set template can define a variant of the preference set schema by supplying attribute templates that provide default values or prescribe how to collect the values for the required attributes.

TABLE 20

PreferenceSetTemplate Object

BasicTemplate ::= PreferenceSetTemplate
PreferenceSetTemplate =>
    EntitySchema         : PreferenceSetSchema Table 21 illustrates a PreferenceSet object in accordance with an embodiment of the present invention. This object includes preference settings, actions, and customizations associated with the enterprise system or a subsystem associated with the enterprise system. Note that the PreferenceSet can aggregate template inherits from compatible policy templates in parent scopes. The Predicate attribute includes a predicate that the rule adds to the rule definition.

TABLE 27

Rule Object

Identifiable ::= Rule
Rule =>
    Definition          : part ref RuleDefinition,
    [InheritedPredicate] : getInheritedPredicate( ):booleanExpression
    [Predicate]       : booleanExpression Table 28 illustrates a RuleConditionDefinition object in accordance with an embodiment of the present invention. A rule condition definition contains the boolean expression that can be evaluated against the event properties. The attribute definitions represent the bind variables of the boolean expression.

TABLE 28

RuleConditionDefinition Object

RuleConditionDefinition =>
    [Predicate]  : booleanExpression,
    Attributes   : {part ref AttributeDefinition}

Table 29 illustrates a RuleActionDefinition object in accordance with an embodiment of the present invention. This object is an operation that the enterprise system can execute in response to rule activation. Note that this object specifies the type of attributes that the enterprise system can pass in the invocation context of the rule action. the related settings for these subsystems. Furthermore, these preference sets can be associated with users, groups, containers (enterprises, organizations, workspaces, and folders), devices, and device profiles.

In one embodiment of the present invention, two preference sets are compatible if they extend the same preference set schema. In this embodiment one preference set can inherit preference properties from a compatible preference set according to a predefined inheritance rule. Furthermore, the Template includes the attribute templates that prescribe how to create the preference properties.

TABLE 21

PreferenceSet Object

Entity ::= PreferenceSet
PreferenceSet =>
    Name         : string,
    [Description]  : richtext,
    [Template]     : PreferenceSetTemplate,
    Preferences   : {part PreferenceProperty}

Table 22 illustrates a PreferenceProperty object in accordance with an embodiment of the present invention. This object stores a preference setting for a preference set that can override the setting on a second preference set. In this embodiment, the second preference set is of a higher scope. If the Final attribute of the second preference set is true, the preference set cannot override the second preference set.

TABLE 22

PreferenceProperty Object

Attribute ::= PreferenceProperty
PreferenceProperty =>
    Name    : immutable string,
    Value   : PropertyValue,
    Type    : getPropertyType( ),
    Final   : boolean Table 23 illustrates a PolicySchema object in accordance with an embodiment of the present invention. This schema specifies metadata, such as rule and attribute definitions that a user can associate with a policy.

TABLE 23

PolicySchema Object

EntitySchema ::= PolicySchema
PolicySchema =>
    Attributes      : {part ref AttributeDefinition},
    RuleDefinitions : {part ref RuleDefinition}

Table 24 illustrates a PolicyTemplate object is accordance with an embodiment of the present invention. The policy template can define a variant of the policy schema by supplying attribute templates that provide default values or prescribe how to collect the values for the required attributes in the rule definitions. In this embodiment, a policy includes a set of rules that select which rule definitions of the policy schema an enterprise system can include with policies derived from this template. Note that the policy template can extend the policy schema in two ways. The policy template can add conjunctive predicates (additional constraints) to the rule conditions of the policy schema, or the policy template can include new rules without deriving them from the rule definitions in the policy schema.

TABLE 24

PolicyTemplate Object

```
BasicTemplate ::= PolicyTemplate
PolicyTemplate =>
    EntitySchema      : PolicySchema,
    Rules             : {part Rule}
```

Table 25 illustrates a Policy object in accordance with an embodiment of the present invention. The policy can specify a set of actions that govern the lifecycles of the entities in a container that is associated with the policy. Note that when a policy is associated with a container, the policy applies to all entities that the container includes. For example, a policy associated with the enterprise system applies to all organizations and workspaces that the enterprise system includes. Note that in this embodiment, the rules include the plan of actions associated with the policy. Furthermore, the attributes of the policy provide the bindings for the bind variables in the rules.

In one embodiment of the present invention, a policy can extend the policy schema and policy templates by adding conjunctive predicates (additional constraints) to the rule conditions of the policy schema or by adding new rules without deriving them from the rule definitions in the policy schema.

TABLE 25

Policy Object

```
Artifact ::= Policy
Policy =>
    [Template]        : PolicyTemplate,
    Enabled           : boolean,
    Final             : boolean,
    Rules             : {part Rule},
    Attributes        : {part Attribute}
```

Table 26 illustrates a RuleDefinition object in accordance with an embodiment of the present invention. This object can specify an instruction of the form "if condition then do actions." Furthermore, this object can specify the definition of an event for the rules to process. Note that the Boolean expression in the rule condition can use attribute definitions from the parent policy schema to represent the bind variables. Furthermore, the policy provides the bindings to evaluate the rule condition. In this embodiment, when the rule condition evaluates to true, the enterprise system activates the rules and actions in order. In addition, the event and attributes that activate the rule can be included with the invocation context of the rule action.

TABLE 26

RuleDefinition Object

```
Identifiable ::= RuleDefinition
RuleDefinition =>
    Name              : string,
    [Description]     : richtext,
    Event             : EventDefinition,
```

TABLE 26-continued

RuleDefinition Object

```
    DefaultPriority   : integer,
    [Condition]       : part RuleConditionDefinition,
    Actions           : <ref RuleActionDefinition>,
    Attributes        : getAttributes( ):{AttributeDefinition}
```

Table 27 illustrates a Rule object in accordance with an embodiment of the present invention. This object can extend a rule definition using additional predicates that the enterprise system can append by conjunction to the predicate in the rule definition. Note that the InheritedPredicate attribute includes the conjunction of predicates that a policy inherits from the policy template. Furthermore, this attribute can include predicates that the policy

TABLE 29

RuleActionDefinition Object

```
Identifiable ::= RuleActionDefinition
RuleActionDefinition =>
    Name              : immutable string,
    [Description]     : richtext,
    Attributes        : {part ref AttributeDefinition}
```

Table 30 illustrates a SubscriptionSchema object in accordance with an embodiment of the present invention. This object can define the attributes that can be part of the user subscriptions. Note that there is at most one subscription schema for each source entity class, which can be a workspace, calendar, task list, forum, message, folder, etc. Furthermore, note the enterprise system can compose a subscription for entities of an entity class based on the entity or container level subscription rule definitions.

TABLE 30

SubscriptionSchema Object

```
EntitySchema ::= SubscriptionSchema
SubscriptionSchema =>
    Attributes        : {part ref AttributeDefinition},
    EntitySubscriptionRuleDefinitions : {part SubscriptionRuleDefinition},
    ContainerSubscriptionRuleDefinitions : {part SubscriptionRuleDefinition},
    SourceEntityClass : EntityClass
```

In one embodiment of the present invention, the enterprise system uses container subscription rule definitions to compose a blanket subscription on all entities of an entity class in the container.

Table 31 illustrates a SubscriptionTemplate object in accordance with an embodiment of the present invention. This object can define a variant of the subscription schema by supplying the default settings or prescribing how to collect the settings for the required attributes.

TABLE 31

SubscriptionTemplate Object

```
BasicTemplate ::= SubscriptionTemplate
SubscriptionTemplate =>
    EntitySchema      : SubscriptionSchema,
    SubscriptionRules : {part SubscriptionRule}
```

Table 32 illustrates a Subscription object in accordance with an embodiment of the present invention. This object can include attributes that a user submits prescribing how to automatically react or notify the user when an event occurs on a particular entity. For example, a subscription associated with messages can prescribe how to filter the messages.

In one embodiment of the present invention, a subscription can refer to the subscription template that defines the metadata and forms used to construct the subscriptions. In this embodiment, the user can enable or disable the subscription at any time. Note that a subscription associated with a container can apply to all entities of a given entity class associated with the container. Furthermore, note that a second subscription associated with a specific entity can override the subscription. This is indicated by the Overrides attribute which refers to a container level subscription which the subscription overrides. Note that the subscription rules specify actions based on conditions which are associated with events, source entities, and action doers for automatic reaction to or notification of an associated event.

TABLE 32

Subscription Object

Artifact ::= Subscription
Subscription =>
   [Template]         : SubscriptionTemplate,
   Attributes          : {part Attribute},
   SubscriptionRules  : {part SubscriptionRule},
   Enabled           : boolean,
   [Overrides]        : Subscription,
   [AttachedTo]      : Entity Table 33 illustrates a SubscriptionRuleDefinition object in accordance with an embodiment of the present invention. This object can specify the available conditions and actions to compose subscription rules.

TABLE 33

SubscriptionRuleDefinition Object

Identifiable ::= SubscriptionRuleDefinition
SubscriptionRuleDefinition =>
   Name        : string,
   [Description] : richtext,
   Conditions   : {part SubscriptionConditionDefinition},
   Actions      : {part SubscriptionActionDefinition}

Table 34 illustrates a SubscriptionConditionDefinition object in accordance with an embodiment of the present invention. This object can specify the format of a condition.

TABLE 34

SubscriptionConditionDefinition Object

Identifiable ::= SubscriptionConditionDefinition
SubscriptionConditionDefinition =>
   Name        : string,
   [Description] : richtext,
   Attributes   : {ref AttributeDefinition}

Table 35 illustrates a SubscriptionActionDefinition object in accordance with an embodiment of the present invention. This object can specify the format of an action.

TABLE 35

SubscriptionActionDefinition Object

Identifiable ::= SubscriptionActionDefinition
SubscriptionActionDefinition =>
   Name        : string,
   [Description] : richtext,
   Attributes   : {ref AttributeDefinition}

Table 36 illustrates a SubscriptionRule object in accordance with an embodiment of the present invention. This object can specify the required conditions to execute a subscription and the actions that the subscription performs. The Conjunctive attribute specifies whether the enterprise system evaluates the conditions conjunctively. If so, the enterprise system requires that all conditions be satisfied before executing the actions associated with the subscription. If disjunctive evaluation is used, the enterprise system evaluates each condition independently. The enterprise system then executes the actions when any of the conditions are satisfied.

TABLE 36

SubscriptionRule Object

SubscriptionRule =>
   Name        : string,
   [Description] : richtext,
   Definition   : ref SubscriptionRuleDefinition,
   Conjunctive  : boolean,
   Conditions   : {ref SubscriptionConditionDefinition},
   Actions      : <ref SubscriptionActionDefinition>

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically executing a rule in an enterprise system, wherein the rule is associated with an event, the method comprising:
   receiving an event object at the enterprise system;
   creating an intermediate event object based on the event object, wherein the intermediate object is an invocation context for the rule;
   filtering a set of rules with the intermediate event object to obtain a subset of rules;
   selecting a rule that is associated with the event from the subset of rules; and
   executing the rule.

2. The method of claim 1, wherein the intermediate event object comprises an identifier for an environment associated with the event or rule, and wherein the environment specifies entities associated with the event or rule.

3. The method of claim 1, wherein creating the intermediate event object can involve:
   retrieving data from the event object;
   storing the data in the intermediate event object;
   retrieving additional data from entities associated with the event object;
   storing the additional data in the intermediate event object;
   associating the entity identifiers (EIDs) of the entities associated with the additional retrieved data;

determining an effective Access Control List (ACL) from the EIDs associated with the additional retrieved data; and authorizing access to the data stored in the intermediate event object using the associated effective ACL.

4. The method of claim 1, wherein filtering the set of rules involves performing a pattern matching operation on the set of rules, wherein the pattern matching operation matches indexed predicates associated with the set of rules to data associated with the intermediate event object.

5. The method of claim 1, wherein selecting the rule from the subset of rules involves evaluating rule conditions associated with each rule based on indexed predicates and sparse predicates over data associated with the intermediate event object.

6. The method of claim 1, wherein after filtering the set of rules, the method further comprises determining a user context which facilitates selecting a rule from the subset of rules.

7. The method of claim 6, wherein determining the user context involves:
receiving the user context with the set of rules; and
storing the user context with the set of rules.

8. The method of claim 1, wherein the rule specifies:
a set of indexed predicates required to invoke the rule;
a set of sparse predicates required to invoke the rule; and
a set of actions which are performed when the rule executes.

9. The method of claim 8, wherein the set of actions can involve:
notifying an actor which has a subscription associated with the event about the occurrence of the event, wherein the actor is an entity which can perform actions upon other entities, and wherein an entity is an object;
notifying a user about the occurrence of the event;
invoking any action on the enterprise system or any operation on any entity;
invoking a second rule;
resolving conflicts between preference settings, wherein the preference settings can be associated with multiple actors;
combining multiple local preferences to derive global preferences for a shared workspace;
switching between preference profiles;
tagging the entity;
categorizing the entity;
selecting the sensitivity for the entity;
enabling roles;
disabling roles;
granting privileges; and
revoking privileges.

10. The method of claim 1, wherein a second rule can extend the rule.

11. The method of claim 1, wherein a policy can extend:
a policy schema which specifies attributes associated with the rule; and
a policy template which specifies how to perform data collection for data associated with the attributes.

12. A non-transitory computer-readable storage medium storing instructions that when executed by a computer cause the computer to perform a method for automatically executing a rule in an enterprise system, wherein the rule is associated with an event, the method comprising:
receiving an event object at the enterprise system;
creating an intermediate event object based on the event object, wherein the intermediate object is an invocation context for the rule;
filtering a set of rules with the intermediate event object to obtain a subset of rules;
selecting a rule that is associated with the event from the subset of rules; and
executing the rule.

13. The computer-readable storage medium of claim 12, wherein the intermediate event object comprises an identifier for an environment associated with the event or rule, and wherein the environment specifies entities associated with the event or rule.

14. The computer-readable storage medium of claim 12, wherein creating the intermediate event object can involve:
retrieving data from the event object;
storing the data in the intermediate event object;
retrieving additional data from entities associated with the event object;
storing the additional data in the intermediate event object;
associating the entity identifiers (EIDs) of the entities associated with the additional retrieved data;
determining an effective Access Control List (ACL) from the EIDs associated with the additional retrieved data; and
authorizing access to the data stored in the intermediate event object using the associated effective ACL.

15. The computer-readable storage medium of claim 12, wherein filtering the set of rules involves performing a pattern matching operation on the set of rules, wherein the pattern matching operation matches indexed predicates associated with the set of rules to data associated with the intermediate event object.

16. The computer-readable storage medium of claim 12, wherein selecting the rule from the subset of rules involves evaluating rule conditions associated with each rule based on indexed predicates and sparse predicates over data associated with the intermediate event object.

17. The computer-readable storage medium of claim 12, wherein after filtering the set of rules, the method further comprises determining a user context which facilitates selecting a rule from the subset of rules.

18. The computer-readable storage medium of claim 17, wherein determining the user context involves:
receiving the user context with the set of rules; and
storing the user context with the set of rules.

19. The computer-readable storage medium of claim 12, wherein the rule specifies:
a set of indexed predicates required to invoke the rule;
a set of sparse predicates required to invoke the rule; and
a set of actions which are performed when the rule executes.

20. The computer-readable storage medium of claim 19, wherein the set of actions can involve:
notifying an actor which has a subscription associated with the event about the occurrence of the event, wherein the actor is an entity which can perform actions upon other entities, and wherein an entity is an object;
notifying a user about the occurrence of the event;
invoking any action on the enterprise system or any operation on any entity;
invoking a second rule;
resolving conflicts between preference settings, wherein the preference settings can be associated with multiple actors;
combining multiple local preferences to derive global preferences for a shared workspace;
switching between preference profiles;
tagging the entity;
categorizing the entity;

selecting the sensitivity for the entity;
enabling roles;
disabling roles;
granting privileges; and
revoking privileges.

21. The computer-readable storage medium of claim 12, wherein a second rule can extend the rule.

22. The computer-readable storage medium of claim 12, wherein a policy can extend:
- a policy schema which specifies attributes associated with the rule; and
- a policy template which specifies how to perform data collection for data associated with the attributes.

23. An apparatus configured to automatically execute a rule in an enterprise system, wherein the rule is associated with an event, comprising:
- a receiving mechanism configured to receive an event object at the enterprise system;
- a creation mechanism configured to create an intermediate event object based on the event object, wherein the intermediate object is an invocation context for the rule;
- a filter mechanism configured to filter a set of rules with the intermediate event object to obtain a subset of rules;
- a selection mechanism configured to select a rule that is associated with the event from the subset of rules; and
- an execution mechanism configured to execute the rule.

24. The apparatus of claim 23, wherein the intermediate event object comprises an identifier for an environment associated with the event or rule, and wherein the environment specifies entities associated with the event or rule.

25. The apparatus of claim 23, wherein the creation mechanism is configured to create the intermediate event object by:
- retrieving data from the event object;
- storing the data in the intermediate event object;
- retrieving additional data from entities associated with the event object;
- storing the additional data in the intermediate event object;
- associating the entity identifiers (EIDs) of the entities associated with the additional retrieved data;
- determining an effective Access Control List (ACL) from the EIDs associated with the additional retrieved data; and
- authorizing access to the data stored in the intermediate event object using the associated effective ACL.

* * * * *

UNITED STATES PATENT AND TRADEMARK OFFICE
CERTIFICATE OF CORRECTION

| | | |
|---|---|---|
| PATENT NO. | : 7,797,289 B2 | |
| APPLICATION NO. | : 11/850566 | |
| DATED | : September 14, 2010 | |
| INVENTOR(S) | : Eric S. Chan et al. | |

It is certified that error appears in the above-identified patent and that said Letters Patent is hereby corrected as shown below:

In column 2, line 64, delete "Policy Observers" and insert -- PolicyObservers --, therefor.

In column 3, line 1, delete "Attribute Definition" and insert -- AttributeDefinition --, therefor.

In column 3, line 12, delete "Basic Template" and insert -- BasicTemplate --, therefor.

In column 3, line 14, delete "Attribute Template" and insert -- AttributeTemplate --, therefor.

In column 3, line 18, delete "Template Configuration" and insert -- TemplateConfiguration --, therefor.

In column 3, line 20, delete "Preference Profile" and insert -- PreferenceProfile --, therefor.

In column 15, line 34, delete "Policy Observers" and insert -- PolicyObservers --, therefor.

In column 16, line 10, delete "Attribute Definition" and insert -- AttributeDefinition --, therefor.

In column 17, line 38, delete "Attribute Template" and insert -- AttributeTemplate --, therefor.

In column 18, line 16, delete "Template Configuration" and insert -- TemplateConfiguration --, therefor.

In column 18, line 60, delete "Preference Profile" and insert -- PreferenceProfile --, therefor.

In column 19-20, line 40-65 and 1-6, after "aggregate" delete "template inherits from compatible policy templates in parent scopes. The Predicate attribute includes a predicate that the rule adds to the rule definition.

Signed and Sealed this
Second Day of August, 2011

David J. Kappos
*Director of the United States Patent and Trademark Office*

CERTIFICATE OF CORRECTION (continued)
U.S. Pat. No. 7,797,289 B2

TABLE 27
Rule Object

```
Identifiable ::= Rule
Rule =>
    Definition          :   part ref RuleDefinition,
    [InheritedPredicate :   getInheritedPredicate();BooleanExpression
    [Predicate]         :   booleanExpression
```

Table 28 illustrates a RuleConditionDefinition object in accordance with an embodiment of the present invention. A rule condition definition contains the boolean expression that can be evaluated against the event properties. The attribute definitions represent the bind variables of the boolean expression.

TABLE 28
RuleConditionDefinition Object

```
RuleConditionDefinition=>
    [Predicate]   :   booleanExpression
    Attributes    :   {part ref AttributeDefinition}
```

Table 29 illustrates a RuleActionDefinition object in accordance with an embodiment of the present invention. This object is an operation that the enterprise system can execute in response to rule activation. Note that this object specifies the type of attributes that the enterprise system can pass in the invocation context of the rule action.".

In column 22, line 17, after "policy" insert -- template inherits from compatible policy templates in parent scopes. The Predicate attribute includes a predicate that the rule adds to the rule definition.

TABLE 27
Rule Object

```
Identifiable ::= Rule
Rule =>
    Definition          :   part ref RuleDefinition,
    [InheritedPredicate :   getInheritedPredicate();BooleanExpression
    [Predicate]         :   booleanExpression
```

Table 28 illustrates a RuleConditionDefinition object in accordance with an embodiment of the present invention. A rule condition definition contains the boolean expression that can be evaluated against the event properties. The attribute definitions represent the bind variables of the boolean expression.

TABLE 28
RuleConditionDefinition Object

```
RuleConditionDefinition=>
    [Predicate]   :   booleanExpression
    Attributes    :   {part ref AttributeDefinition}
```

Table 29 illustrates a RuleActionDefinition object in accordance with an embodiment of the present invention. This object is an operation that the enterprise system can execute in response to rule activation. Note that this object specifies the type of attributes that the enterprise system can pass in the invocation context of the rule action. --.